(12) United States Patent
Hu et al.

(10) Patent No.: US 11,973,400 B2
(45) Date of Patent: Apr. 30, 2024

(54) POWER CONSUMPTION CONTROL DEVICE, MAGNETIC LEVITATION SYSTEM, AND POWER CONSUMPTION CONTROL METHOD

(71) Applicant: GREE ELECTRIC APPLIANCES, INC. OF ZHUHAI, Qianshan Zhuhai (CN)

(72) Inventors: Yusheng Hu, Zhuhai (CN); Weilin Guo, Zhuhai (CN); Yongling He, Zhuhai (CN); Daofu Hu, Zhuhai (CN); Xue Li, Zhuhai (CN); Cong Zhao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 553 days.

(21) Appl. No.: 17/299,692

(22) PCT Filed: Sep. 10, 2019

(86) PCT No.: PCT/CN2019/105084
§ 371 (c)(1),
(2) Date: Jun. 3, 2021

(87) PCT Pub. No.: WO2020/125077
PCT Pub. Date: Jun. 25, 2020

(65) Prior Publication Data
US 2022/0060083 A1 Feb. 24, 2022

(30) Foreign Application Priority Data

Dec. 17, 2018 (CN) .......................... 201811544091.X

(51) Int. Cl.
*H02K 7/09* (2006.01)
*H02N 15/00* (2006.01)

(52) U.S. Cl.
CPC .............. *H02K 7/09* (2013.01); *H02N 15/00* (2013.01); *F16C 2233/00* (2013.01)

(58) Field of Classification Search
CPC ...... H02K 7/09; H02N 15/00; F16C 2233/00; F16C 32/0442; F16C 32/0451; F16C 2300/22; F16C 2380/00
(Continued)

(56) References Cited

U.S. PATENT DOCUMENTS 6,595,041 B2 * 7/2003 Hansen .................... G01G 7/00
73/514.31
2007/0063661 A1 3/2007 Galli et al.

FOREIGN PATENT DOCUMENTS

CN 101476593 A 7/2009
CN 102072251 A 5/2011
(Continued)

OTHER PUBLICATIONS

Extended European Search Report dated Dec. 23, 2021, issued in European Application No. 19 899 439.1, 52 pages.
(Continued)

*Primary Examiner* — David Luo
(74) *Attorney, Agent, or Firm* — Christensen O'Connor Johnson Kindness PLLC

(57) ABSTRACT

A power consumption control device includes: a voltage detection circuit configured to detect whether an input power supply of a magnetic levitation system to be controlled is turned off; and a comparison unit configured to detect an operating parameter of a motor of the magnetic levitation system during an operation of the motor as a generator, and compare the operating parameter with a set parameter to obtain a comparison result; a motor controller of the magnetic levitation system controls the motor of the magnetic levitation system to operate as the generator in a case that the input power supply is turned off, a bearing controller of the magnetic levitation system adjusts a magnitude of a bearing bias current of the magnetic levitation system according to the comparison result, to control a power consumption of a magnetic levitation bearing of the magnetic levitation system within a set range.

20 Claims, 4 Drawing Sheets

(58) Field of Classification Search
USPC .................................................. 318/255, 34
See application file for complete search history.

(56) References Cited

FOREIGN PATENT DOCUMENTS

| | | |
|---|---|---|
| CN | 103812320 A | 5/2014 |
| CN | 105337398 A | 2/2016 |
| CN | 106090012 A | 11/2016 |
| CN | 107846159 A | 3/2018 |
| CN | 108365779 A | 8/2018 |
| CN | 108696187 A | 8/2018 |
| CN | 109787515 A | 5/2019 |
| JP | 2000060169 A | 2/2000 |
| WO | 02/21674 A1 | 3/2002 |

OTHER PUBLICATIONS

International Search Report dated Dec. 11, 2019, issued in International Application No. PCT/CN2019/105084, filed Sep. 10, 2019, 2 pages.

* cited by examiner

POWER CONSUMPTION CONTROL DEVICE, MAGNETIC LEVITATION SYSTEM, AND POWER CONSUMPTION CONTROL METHOD

CROSS REFERENCE TO RELATED APPLICATION

The present application is based on and claims priority to Chinese Patent Application with No. 201811544091.X and filed on Dec. 17, 2018, the content of which is expressly incorporated herein by reference in its entirety.

TECHNICAL FIELD

The present disclosure relates to the field of motor technology, and specifically relates to a power consumption control device, a magnetic levitation system and a power consumption control method, and particularly to a power consumption control device for a magnetic levitation bearing, a magnetic levitation system, and a power consumption control method.

BACKGROUND

Magnetic levitation bearings use the electromagnetic force to suspend the rotor in the air so that there is no mechanical contact between the rotor and the stator. Since the magnetic levitation bearing system is often applied in high-speed rotating systems, the reliability of the power supply of the magnetic levitation bearing system is definitely ensured, especially when the motor has a sudden power cut when operating at a high speed, the shaft can still be suspended until the shaft stops rotating. At present, the commonly used method is to supply power to the magnetic levitation bearing system through the motor when power cut is abnormal, as shown in FIG. 1. The electricity generated by the motor is fed back to the DC bus through the motor controller to convert the kinetic energy into electrical energy and provide it to the magnetic levitation bearing system until the kinetic energy is consumed completely and the shaft drops slowly. The power consumption of the magnetic levitation bearing system directly affects the magnitude of the feedback current $I_m$ of the motor. The greater the power consumption, the greater the feedback current $I_m$, and vice versa. In addition, since the motor speed is getting lower and lower during the process of stopping, the feedback current $I_m$ of the motor is also larger and larger.

SUMMARY

The present disclosure provides a power consumption control device, including: a voltage detection circuit, configured to detect whether an input power supply of a magnetic levitation system to be controlled is turned off; and a comparison unit, configured to detect an operating parameter of a motor of the magnetic levitation system during an operation of the motor as a generator, and compare the operating parameter with a set parameter to obtain a comparison result; where the motor controller of the magnetic levitation system controls the motor of the magnetic levitation system to operate as the generator in a case that the input power supply is turned off, a bearing controller of the magnetic levitation system adjusts a magnitude of a bearing bias current of the magnetic levitation system according to the comparison result, to control a power consumption of a magnetic levitation bearing of the magnetic levitation system within a set range.

In some embodiments, the operating parameter includes a motor feedback current, the set parameter includes a set voltage parameter, the comparison unit includes a current comparison circuit, the comparison result includes a voltage comparison result; the current comparison circuit is configured to detect the motor feedback current during the operation of the motor as the generator, and convert the motor feedback current into a voltage value, and compare the voltage value with a set voltage parameter to obtain a voltage comparison result.

In some embodiments, the set voltage parameter is less than a protection voltage corresponding to a protection current of the motor; the current comparison circuit includes a comparator.

In some embodiments, the operating parameter includes a motor shaft rotation speed signal, the set parameter includes a set rotation speed parameter, the comparison unit includes a rotation speed comparison circuit, the comparison result includes a rotation speed comparison result; the rotation speed comparison circuit is configured to detect the motor shaft rotation speed signal during the operation of the motor as the generator, and compare the motor shaft rotation speed signal with the set rotation speed parameter to obtain the rotation speed comparison result.

In some embodiments, that the bearing controller of the magnetic levitation system adjusts the magnitude of the bearing bias current of the magnetic levitation system according to the comparison result includes: in a case that the comparison result includes at least one of the voltage value converted from the motor feedback current during the operation of the motor as the generator being greater than or equal to the set voltage parameter, or the motor shaft rotation speed signal during the operation of the motor as the generator being less than or equal to the set rotation speed parameter, reducing the bearing bias current of the magnetic levitation system in a set mode, to control the power consumption of the magnetic levitation bearing of the magnetic levitation system within the set range through a differential control mode.

In some embodiments, the power consumption control device satisfies at least one of the following: the set mode includes at least one of a linear mode or a stepped mode; or, the differential control mode includes: the bearing controller provides the bearing bias current to two bearing coils with a same degree of freedom, and pulls the bearing back to a set equilibrium position through a resultant force generated by the differential of the two bearing coils.

In another aspect of the present disclosure, a magnetic levitation system is provided, which includes the above-mentioned power consumption control device.

In some embodiments, the magnetic levitation system further includes: a motor controller, configured to control the motor of the magnetic levitation system to operate as the generator in a case that the input power supply is turned off; and a bearing controller, configured to adjust the magnitude of the bearing bias current of the magnetic levitation system according to the comparison result, to control the power consumption of the magnetic levitation bearing of the magnetic levitation system within the set range.

In another aspect of the present disclosure, a power consumption control method for a magnetic levitation system is provided, which includes: detecting, by a voltage detection circuit, whether an input power supply of the magnetic levitation system to be controlled is turned off;

controlling, by a motor controller of the magnetic levitation system, a motor of the magnetic levitation system to operate as a generator when the input power supply is turned off; detecting, by a comparison unit, an operating parameter of the motor during an operation of the motor as the generator, and comparing the operating parameter with a set parameter to obtain a comparison result; adjusting, by a bearing controller of the magnetic levitation system, a magnitude of a bearing bias current of the magnetic levitation system according to the comparison result, to control a power consumption of a magnetic levitation bearing of the magnetic levitation system within a set range.

In some embodiments, the operating parameter includes a motor feedback current, the set parameter includes a set voltage parameter, the comparison result includes a voltage comparison result; the detecting, by the comparison unit, the operating parameter of the motor during the operation of the motor as the generator and comparing the operating parameter with the set parameter to obtain the comparison result includes: detecting, by a current comparison circuit, the motor feedback current during the operation of the motor as the generator, converting the motor feedback current into a voltage value before comparing the voltage value with the set voltage parameter to obtain the voltage comparison result.

In some embodiments, the set voltage parameter is less than a protection voltage corresponding to a protection current of the motor; the current comparison circuit includes a comparator.

In some embodiments, the operating parameter includes a motor shaft rotation speed signal, the set parameter includes a set rotation speed parameter, the comparison result includes a rotation speed comparison result; the detecting, by the comparison unit, the operating parameter of the motor during the operation of the motor as the generator and comparing the operating parameter with the set parameter to obtain the comparison result includes: detecting, by a rotation speed comparison circuit, the motor shaft rotation speed signal during the operation of the motor as the generator, and comparing the motor shaft rotation speed signal with a set rotation speed parameter to obtain a rotation speed comparison result.

In some embodiments, the adjusting, by the bearing controller of the magnetic levitation system, the magnitude of the bearing bias current of the magnetic levitation system according to the comparison result includes: in a case that the comparison result includes in at least one of the voltage value converted from the motor feedback current during the operation of the motor as the generator being greater than or equal to the set voltage parameter, or the motor shaft rotation speed signal during the operation of the motor as the generator being less than or equal to the set rotation speed parameter, reducing the bearing bias current of the magnetic levitation system in a set mode, to control a power consumption of a magnetic levitation bearing of the magnetic levitation system within a set range through a differential control mode.

In some embodiments, the power consumption control method includes at least one of the following: the set mode includes at least one of a linear mode or a stepped mode; or, the differential control mode includes: the bearing controller provides the bearing bias current to two bearing coils with a same degree of freedom, and pulls the bearing back to a set equilibrium position through a resultant force generated by a differential of the two bearing coils.

BRIEF DESCRIPTION OF THE DRAWINGS

The accompanying drawings described here are utilized to provide further understanding of the present disclosure and constitute a part of the present disclosure. The exemplary embodiments of the present disclosure and the description thereof are utilized to explain the present disclosure, and do not constitute an improper limitation to the present disclosure. In the drawings.

DETAILED DESCRIPTION

The technical solution of the present disclosure will be further described in detail below through the accompanying drawings and embodiments.

In order to make the purpose, technical solution, and advantages of the present disclosure clearer, the technical solution of the present disclosure will be described clearly and completely in conjunction with specific embodiments of the present disclosure and the corresponding drawings. Obviously, the described embodiments are merely some embodiments of the present disclosure, rather than all the embodiments. Based on the embodiments of the present disclosure, all other embodiments obtained by those of ordinary skill in the art without creative work shall fall within the protection scope of the present disclosure.

Figure 1:
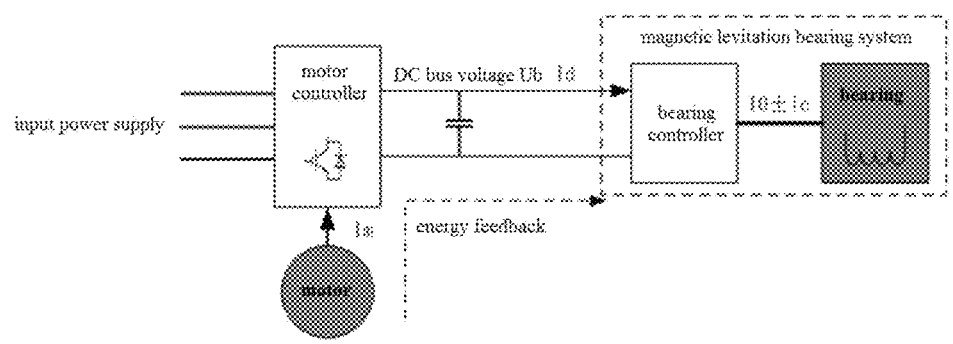
FIG. 1 is a schematic structure diagram of a magnetic levitation energy feedback system.
Figure 2:
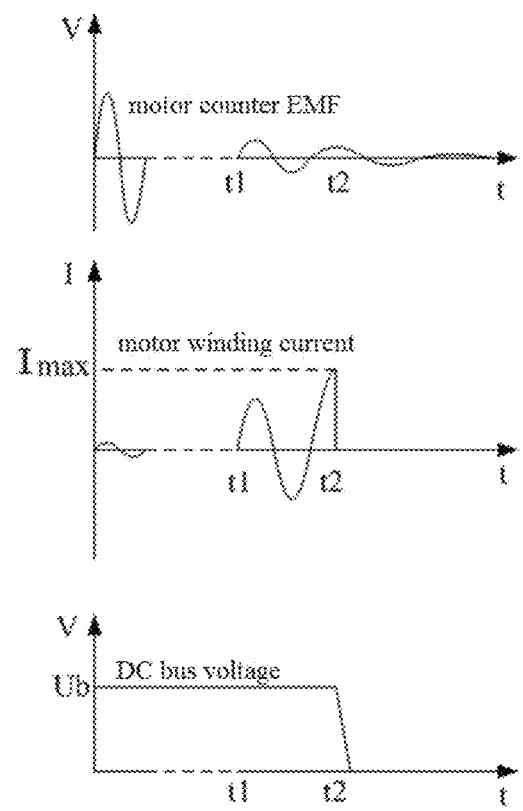
FIG. 2 is a schematic curve diagram showing an energy feedback failure caused by an excessive feedback current.

The inventors found that if the power consumption of the magnetic levitation bearing system is not controlled, as shown in FIG. 2, when the rotation speed drops to a certain level, a Counter EMF of the motor decreases, and the feedback current increases sharply to a protection current Imax of the motor controller when the DC bus voltage remains unchanged, which causes that the energy feedback fails and the magnetic levitation bearing system loses power. At this time, the rotation shaft directly falls on the protective bearing, the kinetic energy of the rotation shaft is converted into frictional heat energy, then the rotation shaft and the protective bearing are both damaged, which affects the lifetime of the entire system.

The purpose of the present disclosure is to provide a power consumption control device, a magnetic levitation system and a power consumption control method thereof in view of the above-mentioned defects, in order to solve the problems in the related art that the motor feedback current exceeds the protection current of the motor controller due to the large power consumption of the magnetic levitation bearing during the energy feedback when the power is turned off and accordingly the energy feedback fails, affecting the reliability of the magnetic levitation bearing system, thereby achieving the effect of improving the reliability.

In the solution of the present disclosure, the bias current of the magnetic levitation bearing is adjusted in real time by determining the magnitude of the motor feedback current, to reduce the power consumption of the magnetic levitation bearing and accordingly improve the reliability of the magnetic levitation system.

Furthermore, in the solution of the present disclosure, the bias current of the magnetic levitation bearing is adjusted in real time by determining the magnitude of the motor feedback current during the energy feedback when the power is turned off, to reduce the power consumption of the magnetic levitation bearing, reduce the feedback current, and accordingly improve the reliability and service life of the magnetic levitation bearing system.

Furthermore, in the solution of the present disclosure, the rotation speed signal of the shaft is acquired in real time when power cut is abnormal, and the bias current of the magnetic levitation bearing is adjusted in real time according to the rotation speed signal, in order to reduce the power consumption of the magnetic levitation bearing, thereby reducing the feedback current and improving the reliability of the magnetic levitation system.

Therefore, in the solution of the present disclosure, the bias current of the magnetic levitation bearing is adjusted in real time by determining the magnitude of the motor feedback current, in order to reduce the power consumption of the magnetic levitation bearing, and solve the problems in the related art that the motor feedback current exceeds the protection current of the motor controller due to the large power consumption of the magnetic levitation bearing during the energy feedback when the power is turned off and accordingly the energy feedback fails, affecting the reliability of the magnetic levitation bearing system, thereby overcoming the defects of a low reliability, a short service life and a low safety in the related art, and achieving the advantages of a high reliability, a long service life and a good safety.

Figure 3:
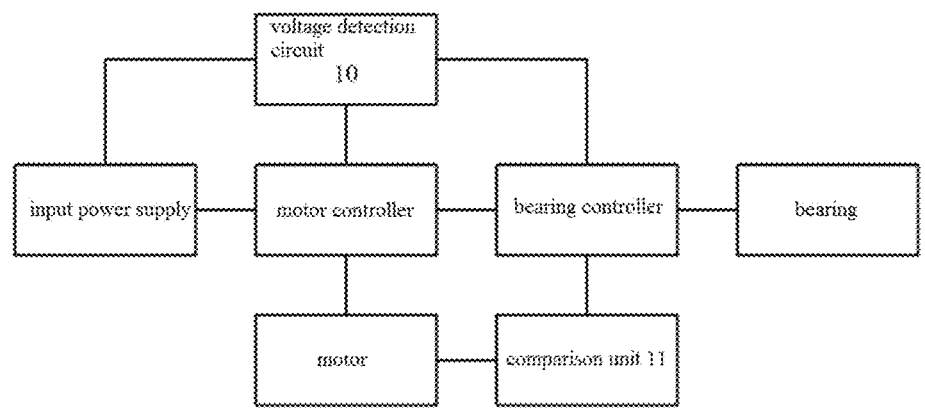
FIG. 3 is a schematic structure diagram of a power consumption control device according to an embodiment of the present disclosure.

According to an embodiment of the present disclosure, a power consumption control device is provided. Referring to FIG. 3, it is a schematic structure diagram illustrating a device according to an embodiment of the present disclosure. In some embodiments, the power consumption control device includes: a voltage detection circuit 10 and a comparison unit 11.

In some embodiments, the voltage detection circuit 10 is configured to detect whether an input power supply of the magnetic levitation system to be controlled is turned off, and provide a detection result to a motor controller and a bearing controller of the magnetic levitation system.

In some embodiments, the motor controller of the magnetic levitation system is configured to control the motor of the magnetic levitation system to operate as a generator in a case that the input power supply is turned off.

In some embodiments, when the input power supply is normal, the motor controller normally drives the motor; when the input power supply is abnormally turned off, the motor operates as a generator, the motor controller is in a forward braking state and boosts the electricity generated by the motor and feeds it back to the DC bus voltage to provide it to the bearing controller.

In some embodiments, the comparison unit 11 is configured to detect an operating parameter of the motor as the generator during the operation, and compare the operating parameter with a set parameter to obtain a comparison result.

In some embodiments, the bearing controller of the magnetic levitation system is configured to adjust the magnitude of the bearing bias current of the magnetic levitation system (that is, the bias current of the magnetic levitation bearing) according to the comparison result, to control the power consumption of the magnetic levitation bearing of the magnetic levitation system within a set range. In some embodiments, the bearing controller of the magnetic levitation system controls the magnitude of the static bias current provided to the bearing coils according to the comparison result, to control the power consumption of the magnetic levitation bearing of the magnetic levitation system within the set range.

In some embodiments of the present disclosure, a power consumption control method for a magnetic levitation bearing is provided, which can solve the problems that the motor feedback current exceeds the protection current of the motor controller due to the large power consumption of the magnetic levitation bearing during the energy feedback when the power is turned off and accordingly the energy feedback fails, thereby improving the reliability of the magnetic levitation bearing.

In some embodiments, when the input power supply is abnormally turned off, the bearing controller acquires the signal in time, the motor operates as the generator at this moment, the motor controller is in a forward braking state and boosts the electricity generated by the motor and feeds it back to the DC bus voltage to provide it to the bearing controller. As the rotation speed decreases, the feedback current gradually increases (as shown in FIG. 2), where the motor feedback current at the time t2 reaches the protection current of the motor controller. In order to ensure that the feedback current does not exceed the protection current of the motor controller, a current comparison circuit is added. Before the feedback current of the motor reaches the protection, for example at the time t1 shown in FIG. 7, the static bias current I0 of the bearing coil is gradually decreased according to a certain mode (for example, a linear mode, a stepped mode, etc.), so that the power consumption of the magnetic levitation bearing is also reduced, the feedback current is relatively reduced and does not exceed the protection current of the motor controller, and the shaft drops safely until the rotation speed of the motor drops to 0.

Therefore, when the input voltage of the magnetic levitation system is turned off, the magnitude of the bearing bias current is adjusted according to the comparison result of the operating parameter during the operation of the motor as the generator and the set parameter, thereby controlling the power consumption of the magnetic levitation bearing within the set range, reducing the power consumption of the magnetic levitation bearing and improving the reliability of the magnetic levitation system.

In some embodiments, the operating parameter includes the motor feedback current. The set parameter includes a set voltage parameter. The comparison unit 11 includes a current comparison circuit 20.

In some embodiments, the current comparison circuit 20 is configured to detect the motor feedback current during the operation of the motor as the generator, and convert the motor feedback current into a voltage value before comparing the voltage value with the set voltage parameter to obtain a voltage comparison result. Furthermore, the bearing controller of the magnetic levitation system is configured to adjust the magnitude of the bias current of the magnetic levitation bearing of the magnetic levitation system according to the voltage comparison result. In some embodiments, the current comparison circuit determines according to the magnitude of the feedback current.

Figure 6:
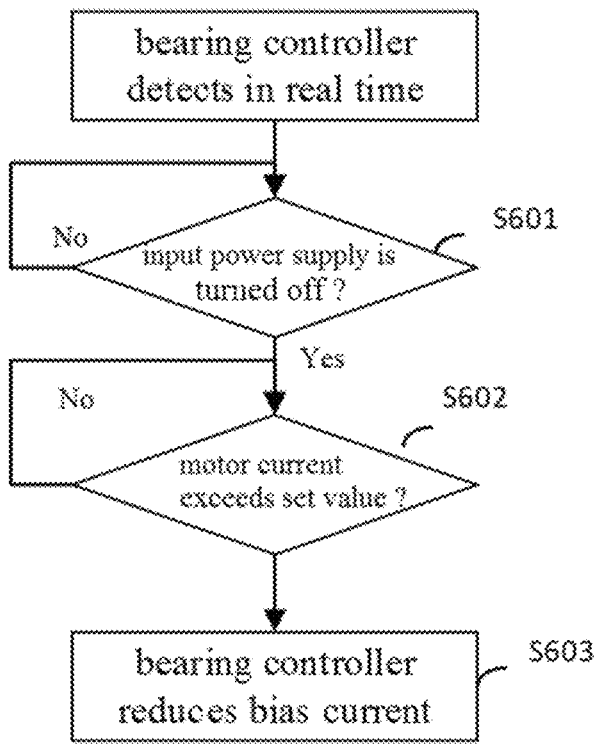
FIG. 6 is a schematic diagram illustrating a control logic of a power consumption control device according to an embodiment of the present disclosure.

In some embodiments, during the energy feedback when the power is turned off, the bias current of the magnetic levitation bearing is adjusted in real time by determining the magnitude of the motor feedback current, to reduce the power consumption of the magnetic levitation bearing, thereby reducing the feedback current, so that the current does not exceed the protection current of the motor controller, and accordingly the reliability and service life of the magnetic levitation bearing system are improved. As shown in FIG. 6, the bearing controller detects in real time.

Step S601: it is determined whether the input power supply is turned off, if the power cut is detected, step 602 is executed, otherwise, the step S601 is continued.

Step S602: it is determined whether the motor feedback current reaches a set value, if the motor feedback current reaches the set value, step 603 is executed, otherwise, the step S602 is continued.

Step S603: the bias current I0 of the magnetic levitation bearing is reduced, accordingly the power consumption of the magnetic levitation bearing is also reduced, and the feedback current is reduced, so that the feedback current does not exceed the set value.

Therefore, the motor feedback current during the operation of the motor as the generator is detected, and the bearing bias current is adjusted according to the comparison result of the motor feedback current and the set voltage parameter, in such a way, the comparison mode is simple and the comparison result is accurate, and the reliability is high.

In some embodiments, the set voltage parameter is less than a protection voltage corresponding to the protection current of the motor.

In some embodiments, the current detection circuit detects the motor feedback current $I_m$ in real time, and converts the current into a corresponding voltage signal $V_{im}$. $V_{im}$ is a voltage signal obtained by multiplying $I_m$ and a predetermined resistance value according to a predetermined regulation, and the magnitude of $V_{im}$ is positively related to $I_m$. $V_{im}$ is compared with the reference voltage $V_{ref}$, when $V_{im}$ is less than $V_{ref}$, a comparator outputs 0; and when $V_{im}$ is greater than or equal to $V_{ref}$, the comparator outputs 1. The value of $V_{ref}$ is less than the value of $V_{im}$ corresponding to the protection current Imax of the motor controller. The output of the current comparison circuit is provided to the bearing controller.

Therefore, by setting the set voltage parameter to be less than the protection voltage corresponding to the protection current of the motor, the bias current of the bearing can be adjusted before the motor feedback current rises to the protection current of the motor, to achieve timely and reliable control of the power consumption of the bearing.

In some embodiments, the current comparison circuit 20 includes a comparator. The motor feedback current serves as one input of the comparator, the set voltage parameter serves as the other input of the comparator, and the voltage comparison result serves as an output of the comparator and is outputted to the bearing controller.

Therefore, by using the comparator as the current comparison circuit, the structure is simple, the comparison mode is simple, and the comparison result has good accuracy and high reliability.

In some embodiments, the operating parameter includes a motor shaft rotation speed signal; the set parameter includes a set rotation speed parameter; the comparison unit includes a rotation speed comparison circuit.

In some embodiments, the rotation speed comparison circuit is configured to detect the motor shaft rotation speed signal during the operation of the motor as a generator, and compare the motor shaft rotation speed signal with the set rotation speed parameter to obtain a rotation speed comparison result. Furthermore, the bearing controller of the magnetic levitation system is configured to adjust the magnitude of the bias current of the magnetic levitation bearing of the magnetic levitation system according to the rotation speed comparison result.

In some embodiments, in the event of an abnormal power cut, the rotation speed signal of the shaft is acquired in real time, and the bias current of the magnetic levitation bearing is adjusted in real time according to the rotation speed signal to reduce the power consumption of the magnetic levitation bearing, thereby reducing the feedback current such that the current does not exceed the protection current of the motor controller.

Therefore, by detecting the motor shaft rotation speed signal during the operation of the motor as a generator and adjusting the bearing bias current according to the comparison result of the motor shaft rotation speed signal and the set rotation speed parameter, the comparison mode is simple and the comparison result has good accuracy and high reliability.

In some embodiments, the step that the bearing controller of the magnetic levitation system adjusts the magnitude of the bearing bias current of the magnetic levitation system according to the comparison result, includes: in a case that the comparison result includes at least one of conditions that the motor feedback current is greater than or equal to the set voltage parameter during the operation of the motor as the generator, or the motor shaft rotation speed signal is less than or equal to the set rotation speed parameter during the operation of the motor as the generator, the bearing bias current of the magnetic levitation system is reduced according to the set mode, to control the power consumption of the magnetic levitation bearing of the magnetic levitation system within the set range by the differential control mode.

Therefore, by reducing the bearing bias current according to the set mode, and accordingly controlling the power consumption of the magnetic levitation bearing within the set range through the differential control mode, it is beneficial to improve the reliability of the magnetic levitation system and then prolong the service life thereof.

In some embodiments, the set mode includes at least one of a linear mode or a stepped mode.

Figure 7:
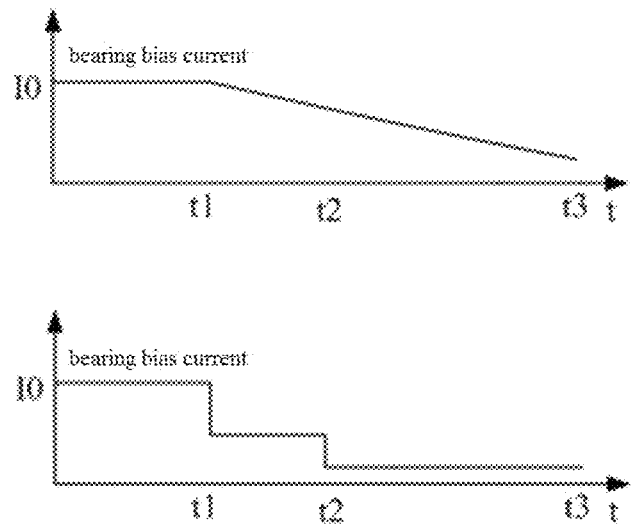
FIG. 7 is a schematic curve diagram showing a bias current variation mode of a power consumption control device according to an embodiment of the present disclosure.

In some embodiments, the mode of reducing the bias current is a linear reduction, or the bias current is reduced in other ways such as a stepped reduction, as shown in FIG. 7.

Therefore, the bearing bias current can be reduced in a variety of modes, so that the adjustment of the bearing bias current is convenient and flexible.

In some embodiments, the differential control method includes: the bearing controller provides the bearing bias current to two bearing coils with the same degree of freedom, and then pulls the bearing back to a set equilibrium position via a resultant force generated by the differential of the two bearing coils.

In some embodiments, when the motor stops operating, during the idling process, the rotation shaft is subjected to relatively less load. At this moment, reduction of the value of the static bias current I0 can also ensure the stable levitation of the shaft. In addition, the magnitude of the static bias current I0 is closely related to the power consumption of the magnetic levitation bearing. The larger the I0, the greater the power consumption; otherwise, the less.

Therefore, the bearing is pulled back to the set equilibrium position by controlling the resultant force generated by the differential of the two bearing coils, so that the control of the power consumption of the magnetic levitation bearing is more reliable and safer.

After a large number of experiments, in the technical solution of the present disclosure, the bias current of the magnetic levitation bearing is adjusted in real time by determining the magnitude of the motor feedback current, to reduce the power consumption of the magnetic levitation bearing, thereby improving the reliability of the magnetic levitation system.

According to an embodiment of the present disclosure, a magnetic levitation system corresponding to a power consumption control device is further provided. In some embodiments, the magnetic levitation system includes the above-mentioned power consumption control device. In some embodiments, the magnetic levitation system also includes a motor controller and a bearing controller, as well as the motor, bearing, etc., as shown in FIG. 3.

In some embodiments of the present disclosure, a power consumption control method for a magnetic levitation bearing, which can solve the problems that the motor feedback current exceeds the protection current of the motor controller due to the large power consumption of the magnetic levitation bearing during the energy feedback when the power is turned off and accordingly the energy feedback fails, thereby improving the reliability of the magnetic levitation bearing system.

In some embodiments, during the energy feedback when the power is turned off, the bias current of the magnetic levitation bearing is adjusted in real time by determining the magnitude of the motor feedback current, to reduce the power consumption of the magnetic levitation bearing, thereby reducing the feedback current, so that the current does not exceed the protection current of the motor controller, and the reliability and service life of the magnetic levitation bearing system are improved.

In some embodiments, in the event of an abnormal power cut, the rotation speed signal of the shaft is acquired in real time, and the bias current of the magnetic levitation bearing is adjusted in real time according to the rotation speed signal, to reduce the power consumption of the magnetic levitation bearing, thereby reducing the feedback current such that the current does not exceed the protection current of the motor controller. In some embodiments, the rotation speed signal of the shaft is the motor shaft rotation speed signal.

In some embodiments, referring to the examples shown in FIGS. 4 to 7, the specific implementation process of the solution of the present disclosure is illustrated.

Figure 4:
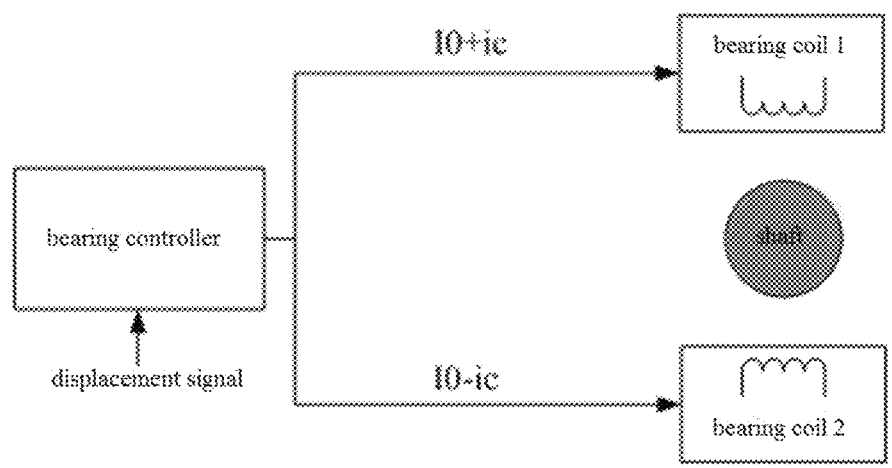
FIG. 4 is a magnetic levitation bearing differential control method for a magnetic levitation system according to an embodiment of the present disclosure.

The power consumption is controlled mainly by using the differential control mode. As shown in FIG. 4, one degree of freedom is taken as an example, the bearing controller provides a static bias current I0 to two coils with the same one degree of freedom, a control current $i_c$ is calculated according to a displacement signal of the shaft. A current of one of the bearing coils is equal to $I0+i_c$, and a current of the other bearing coil is equal to $I0-i_c$. The two bearing coils generate a resultant force to pull the shaft back to the equilibrium position. The setting of the static bias current I0 affects the performance of the bearing such as a rigidity, a response speed and so on. When the motor operates normally, the rotation shaft is subjected to a certain load, and the static bias current is set to be larger; when the motor stops operating, the shaft is subjected to less load in the process of idling, at this moment, reduction of the value of the static bias current I0 can also ensure the stable levitation of the shaft. In addition, the magnitude of the static bias current I0 is closely related to the power consumption of the magnetic levitation bearing. The larger the I0, the greater the power consumption; otherwise, the less.

Figure 5:
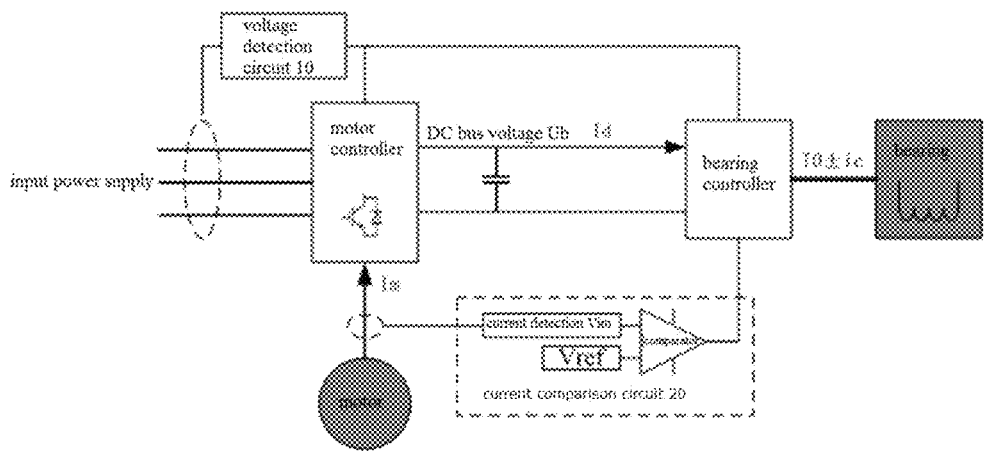
FIG. 5 is a schematic structure diagram of a power consumption control device according to another embodiment of the present disclosure.

In some embodiments, according to the above analysis, in the specific control process of the present disclosure, a system control block diagram of the hardware working principle is shown in FIG. 5, and the following components can be included:

a bearing controller, a bearing, a motor, a motor controller, a current comparison circuit, a voltage detection circuit.

In some embodiments, the voltage detection circuit is configured to detect whether the input power supply is turned off, and provide the detection result to the bearing controller and the motor controller.

In some embodiments, when the input power supply is normal, the motor controller normally drives the motor; when the input power supply is abnormally turned off, the motor operates as a generator at this moment, the motor controller is in a forward braking state and boosts the electricity generated by the motor and feeds it back to the DC bus voltage to provide it to the bearing controller.

In some embodiments, a current detection circuit in the current comparison circuit 20 detects the motor feedback current $I_m$ in real time, and converts the current into the corresponding voltage signal $V_{im}$, and compares $V_{im}$ with the reference voltage $V_{ref}$. When $V_{im}$ is less than $V_{ref}$, the comparator outputs 0; when $V_{im}$ is greater than or equal to $V_{ref}$, the comparator outputs 1. The value of Via is less than the value of $V_{im}$ corresponding to the protection current Imax of the motor controller. The output of the current comparison circuit is provided to the bearing controller.

In FIG. 5, a current comparison circuit is added, and the output of this circuit is directly provided to the bearing controller. The value of the reference voltage $V_{ref}$ in the circuit is less than the value of $V_{im}$ corresponding to the protection current Imax of the motor controller. The static bias current I0 of the bearing controller is adjustable. The principle of adjustment is determined according to the output of the current comparison circuit, so that a power of the magnetic levitation system can be changed, and the magnitude of the feedback current can be changed.

In some embodiments, when the input power supply is abnormally turned off, the bearing controller obtains the signal in time, and the motor operates as a generator at this moment, the motor controller is in a forward braking state and boosts the electricity generated by the motor and feeds it back to the DC bus voltage to provide it to the bearing controller. As the rotation speed decreases, the feedback current gradually increases (as shown in FIG. 2), where the motor feedback current at the time t2 reaches the protection current of the motor controller. In order to ensure that the feedback current does not exceed the protection current of the motor controller, the current comparison circuit is added. Before the motor feedback current reaches the protection, such as at the time t1 shown in FIG. 7, the static bias current I0 of the bearing coil is gradually reduced according to a certain mode (for example, a linear mode, a stepped mode, etc.), so that the power consumption of the magnetic levitation bearing is also reduced, and the feedback current is relatively reduced and does not exceed the protection current of the motor controller, and the shaft drops safely until the rotation speed of the motor drops to 0.

In some embodiments, the control logic of the solution of the present disclosure is as shown in FIG. 6. The bearing controller detects whether the input power supply is turned off in real time. If the power cut is detected, it is determined whether the motor feedback current reaches the set value. If the motor feedback current reaches the set value, the bias current I0 of the magnetic levitation bearing is reduced, so that the power consumption of the magnetic levitation bearing is also reduced, and the feedback current is also reduced, so that the feedback current does not exceed the set value. In some embodiments, the mode of reducing the bias current is a linear reduction, or the bias current is reduced in other ways such as a stepped reduction, as shown in FIG. 7.

Since the processing and functions implemented by the magnetic levitation system of this embodiment basically correspond to the embodiments, principles, and examples of the device shown in FIGS. 1 to 7, as for the description of this embodiment which is not exhaustive, reference can be made to the relevant description in the aforementioned embodiments, which will not be repeated here.

After a large number of experiments, in the technical solution of the present disclosure, the bias current of the magnetic levitation bearing is adjusted in real time by determining the magnitude of the motor feedback current during the energy feedback when the power is turned off, to reduce the power consumption of the magnetic levitation bearing and reduce the feedback current, thereby improving the reliability and service life of the magnetic levitation bearing system.

Figure 8:
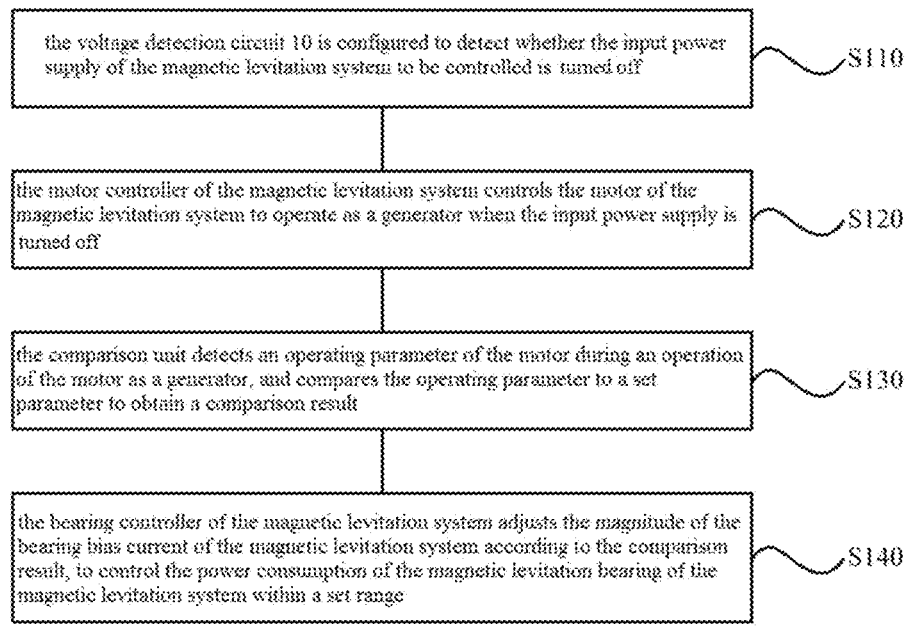
FIG. 8 is a flow chart showing a power consumption control method according to an embodiment of the present disclosure.

According to an embodiment of the present disclosure, a power consumption control method for a magnetic levitation system corresponding to the magnetic levitation system is further provided, as shown in FIG. 8, which is a flow chart showing the method according to an embodiment of the present disclosure. In some embodiments, the power consumption control method for the magnetic levitation system includes flowing step S110 to step S140.

Step S110: the voltage detection circuit 10 is configured to detect whether the input power supply of the magnetic levitation system to be controlled is turned off, and the detection result is provided to the motor controller and the bearing controller of the magnetic levitation system.

In some embodiments, the voltage detection circuit detects whether the input power supply is turned off, and provides the detection result to the bearing controller and the motor controller.

Step S120: the motor controller of the magnetic levitation system controls the motor of the magnetic levitation system to operate as a generator when the input power supply is turned off.

In some embodiments, when the input power supply is normal, the motor controller normally drives the motor; when the input power supply is abnormally turned off, the motor operates as a generator at this moment, the motor controller is in a forward braking state and boosts the electricity generated by the motor and feed it back to the DC bus voltage to the provide it to the bearing controller.

Step S130: the comparison unit detects an operating parameter of the motor during an operation of the motor as a generator, and compares the operating parameter with a set parameter to obtain a comparison result.

Step S140: the bearing controller of the magnetic levitation system adjusts the bearing bias current of the magnetic levitation system (that is, the bias current of the magnetic levitation bearing) according to the comparison result, to control the power consumption of the magnetic levitation bearing of the magnetic levitation system within a set range. In some embodiments, the bearing controller of the magnetic levitation system controls, according to the comparison result, the magnitude of the static bias current provided by the bearing controller to the bearing coil, to control the power consumption of the magnetic levitation bearing of the magnetic levitation system within the set range.

In some embodiments, the power consumption control method for the magnetic levitation bearing provided in the present disclosure can solve the problems that the motor feedback current exceeds the protection current of the motor controller due to the large power consumption of the magnetic levitation bearing during the energy feedback when the power is turned off and accordingly the energy feedback fails, thereby improving the reliability of the magnetic levitation bearing.

In some embodiments, when the input power supply is abnormally turned off, the bearing controller acquires the signal in time, and the motor operates as a generator at this moment, the motor controller is in a forward braking state and boosts the electricity generated by the motor and feed it back to the DC bus voltage to provide it to the bearing controller. As the rotation speed decreases, the feedback current gradually increases (as shown in FIG. 2), the motor feedback current reaches the protection current of the motor controller at the time t2. In order to ensure that the feedback current does not exceed the protection current of the motor controller, a current comparison circuit is added. Before the motor feedback current reaches the protection, such as at the time t1 shown in FIG. 7, the static bias current I0 of the bearing coil is gradually reduced according to a certain mode (for example, a linear mode, a stepped mode, etc.), so that the power consumption of the magnetic levitation bearing is also reduced, and the feedback current is relatively reduced and does not exceed the protection current of the motor controller, and the shaft drops safely until the rotation speed of the motor drops to 0.

Therefore, when the input voltage of the magnetic levitation system is turned off, the bearing bias current is adjusted according to the comparison result of the operating parameter of the motor during the operation of the motor as a generator and the set parameter, thereby controlling the power consumption of the magnetic levitation bearing within the set range to reduce the power consumption of the magnetic levitation bearing and improve the reliability of the magnetic levitation system.

In some embodiments, the operating parameter includes the motor feedback current; the set parameter includes the set voltage parameter.

In some embodiments, the step that the comparison unit detects the operating parameter of the motor during the operation of the motor as the generator, and compares the operating parameter with the set parameter to obtain the comparison result includes: the current comparison circuit 20 detects the motor feedback current during the operation of the motor as the generator, and converts the motor feedback current into a voltage value before comparing the voltage value to the set voltage parameter to obtain the voltage comparison result. Furthermore, the bearing controller of the magnetic levitation system can adjust the magnitude of the bias current of the magnetic levitation bearing of the magnetic levitation system according to the voltage comparison result.

In some embodiments, during the energy feedback when the power is turned off, the bias current of the magnetic levitation bearing is adjusted in real time by determining the magnitude of the motor feedback current, to reduce the power consumption of the magnetic levitation bearing, thereby reducing the feedback current so that the current does not exceed the protection current of the motor controller, and the reliability and service life of the magnetic levitation bearing system are improved. As shown in FIG. 6, the bearing controller detects in real time whether the input power supply is turned off. If the power cut is detected, it is determined whether the motor feedback current reaches the set value. If the motor feedback current reaches the set value, the bias current I0 of the magnetic levitation bearing is reduced. In such a way, the power consumption of the magnetic levitation bearing is reduced accordingly, the feedback current is also reduced and does not exceed the set value.

Therefore, by detecting the motor feedback current during the operation of the motor as the generator and adjusting the bearing bias current according to the comparison result of the motor feedback current and the set voltage parameter, the comparison mode is simple and the comparison result has good accurate and high reliability.

In some embodiments, the voltage parameter is set to be less than the protection voltage corresponding to the protection current of the motor.

In some embodiments, the current detection circuit detects the motor feedback current $I_m$ in real time, and converts this current into a corresponding voltage signal $V_{im}$. $V_{im}$ is compared with the reference voltage $V_{ref}$, the comparator outputs 0 when $V_{im}$ is less than $V_{ref}$, and the comparator outputs 1 when $V_{im}$ is greater than or equal to $V_{ref}$. The value of $V_{ref}$ is less than the value of $V_{im}$ corresponding to the protection current Imax of the motor controller. The output of the current comparison circuit is provided to the bearing controller.

Therefore, by setting the set voltage parameter to be less than the protection voltage corresponding to the protection current of the motor, the bearing bias current can be adjusted before the motor feedback current rises to the protection current of the motor, in order to achieve timely and reliable control of the power consumption of the bearing.

In some embodiments, the current comparison circuit 20 includes a comparator. The motor feedback current is used as one input of the comparator, the set voltage parameter is used as the other input of the comparator, and the voltage comparison result is used as the output of the comparator and is outputted to the bearing controller.

Therefore, by using the comparator as the current comparison circuit, the structure is simple, the comparison mode is simple, and the comparison result has good accuracy and high reliability.

In some embodiments, the operating parameter includes a motor shaft rotation speed signal; the set parameter includes a set rotation speed parameter.

In some embodiments, the step that the comparison unit detects the operating parameter of the motor during the operation of the motor as a generator, and compares the operating parameter with the set parameter to obtain the comparison result also includes: a rotation speed comparison circuit detects the motor shaft rotation speed signal during the operation of motor as the generator, and compares the motor shaft rotation speed signal with the set rotation speed parameter to obtain a speed comparison result. Furthermore, the bearing controller of the magnetic levitation system adjusts the magnitude of the bias current of the magnetic levitation bearing of the magnetic levitation system according to the speed comparison result.

In some embodiments, in the event of an abnormal power cut, the rotation speed signal of the shaft is acquired in real time, and the bias current of the magnetic levitation bearing is adjusted in real time according to the rotation speed signal to reduce the power consumption of the magnetic levitation bearing, thereby reducing the feedback current such that the current does not exceed the protection current of the motor controller.

Therefore, by detecting the motor shaft rotation speed signal during the operation of the motor as a generator, and adjusting the bearing bias current according to the comparison result of the motor shaft rotation speed signal and the set rotation speed parameter, the comparison mode is simple and the comparison result has good accuracy and high reliability.

In some embodiments, the step that the bearing controller of the magnetic levitation system adjusts the magnitude of the bearing bias current of the magnetic levitation system according to the comparison result includes: in a case that the comparison result includes at least one of conditions that the motor feedback current during the operation of the motor as a generator is greater than or equal to the set voltage parameter, or the motor shaft rotation speed signal during the operation of the motor as a generator is less than or equal to the set rotation speed parameter, the bearing bias current of the magnetic levitation system is reduced according to a set mode, to control the power consumption of the magnetic levitation bearing of the magnetic levitation system within the set range through a differential control mode.

Therefore, the bearing bias current is reduced according to the set mode, accordingly the power consumption of the magnetic levitation bearing is controlled within the set range through the differential control mode, which is beneficial to improve the reliability of the magnetic levitation system and thereby the service life is prolonged.

In some embodiments, the set mode includes a linear mode and/or a stepped mode.

In some embodiments, the mode of reducing the bias current is a linear reduction, or the bias current is reduced in other ways such as a stepped reduction, as shown in FIG. 7.

Therefore, the bearing bias current is reduced in a variety of modes, so that the adjustment of the bearing bias current is convenient and flexible.

In some embodiments, the differential control mode includes: the bearing controller provides the bearing bias current to two bearing coils with the same degree of freedom, and then pulls the bearing back to the set equilibrium position through the resultant force generated by the differential of the two bearing coils.

In some embodiments, when the motor stops operating, during the idling process, the rotation shaft is subjected to relatively less load, at this time, the reduction of the value of the static bias current I0 can also ensure the stable levitation of the shaft. In addition, the magnitude of the static bias current I0 is closely related to the power consumption of the magnetic levitation bearing. The larger the I0, the greater the power consumption; the smaller the I0, the lower the power consumption.

Therefore, the bearing is pulled back to the set equilibrium position by controlling the resultant force generated by the differential of the two bearing coils, so that the control of the power consumption of the magnetic levitation bearing is more reliable and safer.

Since the processing and functions implemented by the method in this embodiment basically correspond to the embodiments, principles, and examples of the magnetic levitation system shown in FIGS. 1 to 7, as for the description in this embodiment which is not exhaustive, reference can be made to the relevant description in the aforementioned embodiments, which will not be repeated here.

After a large number of experiments, in the technical solution of this embodiment, the rotation speed signal of the shaft is acquired in real time when the power is abnormally turned off, and the bias current of the magnetic levitation bearing is adjusted in real time according to the rotation speed signal, to reduce the power consumption of the magnetic levitation bearing, thereby reducing the feedback current and improving the reliability of the magnetic levitation system.

To sum up, it is easy for those skilled in the art to understand that the above advantageous modes can be freely combined and superimposed on the premise of no contradiction.

The above are merely embodiments of the present disclosure and are not utilized to limit the present disclosure. For those skilled in the art, the present disclosure can have various modifications and changes. Any modification, equivalent replacement, improvement, etc., made within the spirit and principle of the present disclosure shall be included in the scope of the present disclosure which is subject to the appended claims.

What is claimed is:

1. A power consumption control device, comprising:
a voltage detection circuit, configured to detect whether an input power supply of a magnetic levitation system to be controlled is turned off; and
a comparison unit, configured to detect an operating parameter of a motor of the magnetic levitation system during an operation of the motor as a generator, and compare the operating parameter with a set parameter to obtain a comparison result;
wherein, a motor controller of the magnetic levitation system controls the motor of the magnetic levitation system to operate as the generator in a case that the input power supply is turned off; a bearing controller of the magnetic levitation system adjusts a magnitude of a bearing bias current of the magnetic levitation system according to the comparison result, to control a power consumption of a magnetic levitation bearing of the magnetic levitation system within a set range.

2. The power consumption control device according to claim 1, wherein the operating parameter comprises a motor feedback current, the set parameter comprises a set voltage parameter, the comparison unit comprises a current comparison circuit, the comparison result comprises a voltage comparison result;
the current comparison circuit is configured to detect the motor feedback current during the operation of the motor as the generator, and convert the motor feedback current into a voltage value, and compare the voltage value with a set voltage parameter to obtain a voltage comparison result.

3. The power consumption control device according to claim 2, wherein
the set voltage parameter is less than a protection voltage corresponding to a protection current of the motor;
the current comparison circuit comprises a comparator.

4. The power consumption control device according to claim 2, wherein the operating parameter comprises a motor shaft rotation speed signal, the set parameter comprises a set rotation speed parameter, the comparison unit comprises a rotation speed comparison circuit, the comparison result comprises a rotation speed comparison result;
the rotation speed comparison circuit is configured to detect the motor shaft rotation speed signal during the operation of the motor as the generator, and compare the motor shaft rotation speed signal with the set rotation speed parameter to obtain the rotation speed comparison result.

5. The power consumption control device according to claim 2, wherein that the bearing controller of the magnetic levitation system adjusts the magnitude of the bearing bias current of the magnetic levitation system according to the comparison result, comprises:
in a case that the comparison result comprises at least one of conditions that the voltage value converted from the motor feedback current during the operation of the motor as the generator is greater than or equal to the set voltage parameter, or the motor shaft rotation speed signal during the operation of the motor as the generator is less than or equal to the set rotation speed parameter,
reducing the bearing bias current of the magnetic levitation system in a set mode, to control the power consumption of the magnetic levitation bearing of the magnetic levitation system within the set range through a differential control mode.

6. The power consumption control device according to claim 1, wherein the operating parameter comprises a motor shaft rotation speed signal, the set parameter comprises a set rotation speed parameter, the comparison unit comprises a rotation speed comparison circuit, the comparison result comprises a rotation speed comparison result;
the rotation speed comparison circuit is configured to detect the motor shaft rotation speed signal during the operation of the motor as the generator, and compare the motor shaft rotation speed signal with the set rotation speed parameter to obtain the rotation speed comparison result.

7. The power consumption control device according to claim 1, wherein that the bearing controller of the magnetic levitation system adjusts the magnitude of the bearing bias current of the magnetic levitation system according to the comparison result, comprises:
in a case that the comparison result comprises at least one of conditions that the voltage value converted from the motor feedback current during the operation of the motor as the generator is greater than or equal to the set voltage parameter, or the motor shaft rotation speed signal during the operation of the motor as the generator is less than or equal to the set rotation speed parameter,
reducing the bearing bias current of the magnetic levitation system in a set mode, to control the power consumption of the magnetic levitation bearing of the magnetic levitation system within the set range through a differential control mode.

8. The power consumption control device according to claim 7, wherein the power consumption control device satisfies at least one of the following:
the set mode comprises at least one of a linear mode or a stepped mode;
or,
the differential control mode comprises: the bearing controller provides the bearing bias current to two bearing coils with a same degree of freedom, and pulls the bearing back to a set equilibrium position through a resultant force generated by the differential of the two bearing coils.

9. A magnetic levitation system, comprising the power consumption control device of claim 1.

10. The magnetic levitation system according to claim 9, further comprising:
a motor controller, configured to control the motor of the magnetic levitation system to operate as the generator in a case that the input power supply is turned off; and a bearing controller, configured to adjust the magnitude of the bearing bias current of the magnetic levitation system according to the comparison result, to control the power consumption of the magnetic levitation bearing of the magnetic levitation system within the set range.

11. The power consumption control device according to claim 1, wherein when the input power supply is normal, the motor controller normally drives the motor; when the input power supply is abnormally turned off, the motor operates as a generator, the motor controller is in a forward braking state and boosts electricity generated by the motor and feeds the electricity back to a DC bus voltage to provide the electricity to the bearing controller.

12. The power consumption control device according to claim 1, wherein the bearing controller of the magnetic levitation system controls a magnitude of a static bias current provided to a bearing coil according to the comparison result, to control the power consumption of the magnetic levitation bearing of the magnetic levitation system within the set range.

13. A power consumption control method for a magnetic levitation system, comprising:
 detecting, by a voltage detection circuit, whether an input power supply of the magnetic levitation system to be controlled is turned off;
 controlling, by a motor controller of the magnetic levitation system, a motor of the magnetic levitation system to operate as a generator in a case that the input power supply is turned off;
 detecting, by a comparison unit, an operating parameter of the motor during an operation of the motor as the generator, and comparing the operating parameter with a set parameter to obtain a comparison result;
 adjusting, by a bearing controller of the magnetic levitation system, a magnitude of a bearing bias current of the magnetic levitation system according to the comparison result, to control a power consumption of a magnetic levitation bearing of the magnetic levitation system within a set range.

14. The power consumption control method according to claim 13, wherein the operating parameter comprises a motor feedback current, the set parameter comprises a set voltage parameter, the comparison result comprises a voltage comparison result;
 the detecting, by the comparison unit, the operating parameter of the motor during the operation of the motor as the generator and comparing the operating parameter with the set parameter to obtain the comparison result comprises:
 detecting, by a current comparison circuit, the motor feedback current during the operation of the motor as the generator, converting the motor feedback current into a voltage value before comparing the voltage value with the set voltage parameter to obtain the voltage comparison result.

15. The power consumption control method according to claim 14, wherein:
 the set voltage parameter is less than a protection voltage corresponding to a protection current of the motor;
 the current comparison circuit comprises a comparator.

16. The power consumption control method according to claim 14, wherein the operating parameter comprises a motor shaft rotation speed signal, the set parameter comprises a set rotation speed parameter, the comparison result comprises a rotation speed comparison result;
 the detecting, by the comparison unit, the operating parameter of the motor during the operation of the motor as the generator and comparing the operating parameter with the set parameter to obtain the comparison result comprises:
 detecting, by a rotation speed comparison circuit, the motor shaft rotation speed signal during the operation of the motor as the generator, and comparing the motor shaft rotation speed signal with a set rotation speed parameter to obtain a rotation speed comparison result.

17. The power consumption control method according to claim 14, wherein the adjusting, by the bearing controller of the magnetic levitation system, the magnitude of the bearing bias current of the magnetic levitation system according to the comparison result comprises:
 in a case that the comparison result comprises at least one of conditions that the voltage value converted from the motor feedback current during the operation of the motor as the generator is greater than or equal to the set voltage parameter, or the motor shaft rotation speed signal during the operation of the motor as the generator is less than or equal to the set rotation speed parameter,
 reducing the bearing bias current of the magnetic levitation system in a set mode, to control a power consumption of a magnetic levitation bearing of the magnetic levitation system within a set range through a differential control mode.

18. The power consumption control method according to claim 13, wherein the operating parameter comprises a motor shaft rotation speed signal, the set parameter comprises a set rotation speed parameter, the comparison result comprises a rotation speed comparison result;
 the detecting, by the comparison unit, the operating parameter of the motor during the operation of the motor as the generator and comparing the operating parameter with the set parameter to obtain the comparison result comprises:
 detecting, by a rotation speed comparison circuit, the motor shaft rotation speed signal during the operation of the motor as the generator, and comparing the motor shaft rotation speed signal with a set rotation speed parameter to obtain a rotation speed comparison result.

19. The power consumption control method according to claim 13, wherein the adjusting, by the bearing controller of the magnetic levitation system, the magnitude of the bearing bias current of the magnetic levitation system according to the comparison result comprises:
 in a case that the comparison result comprises at least one of conditions that the voltage value converted from the motor feedback current during the operation of the motor as the generator is greater than or equal to the set voltage parameter, or the motor shaft rotation speed signal during the operation of the motor as the generator is less than or equal to the set rotation speed parameter,
 reducing the bearing bias current of the magnetic levitation system in a set mode, to control a power consumption of a magnetic levitation bearing of the magnetic levitation system within a set range through a differential control mode.

20. The power consumption control method according to claim 19, comprising at least one of the following:
 the set mode comprises at least one of a linear mode or a stepped mode;

or, the differential control mode comprises: the bearing controller provides the bearing bias current to two bearing coils with a same degree of freedom, and pulls the bearing back to a set equilibrium position through a resultant force generated by a differential of the two bearing coils.

\* \* \* \* \*